US012663686B2

(12) United States Patent
Luo

(10) Patent No.: US 12,663,686 B2
(45) Date of Patent: Jun. 23, 2026

(54) ELECTRONIC PAPER

(71) Applicants:Chengdu BOE Optoelectronics Technology Co., Ltd., Chengdu (CN); BOE Technology Group Co., Ltd., Beijing (CN)

(72) Inventor: Hao Luo, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 603 days.

(21) Appl. No.: 17/915,110

(22) PCT Filed: Nov. 9, 2021

(86) PCT No.: PCT/CN2021/129584
§ 371 (c)(1),
(2) Date: Sep. 28, 2022

(87) PCT Pub. No.: WO2022/127445
PCT Pub. Date: Jun. 23, 2022

(65) Prior Publication Data
US 2023/0152657 A1     May 18, 2023

(30) Foreign Application Priority Data
Dec. 18, 2020   (CN) .......................... 202011500714.0

(51) Int. Cl.
G02F 1/16766      (2019.01)
G02F 1/167      (2019.01)

(52) U.S. Cl.
CPC .......... G02F 1/16766 (2019.01); G02F 1/167 (2013.01)

(58) Field of Classification Search
CPC .... G02F 1/167; G02F 1/1676; G02F 1/16766; G02F 1/1685
See application file for complete search history.

(56) References Cited

U.S. PATENT DOCUMENTS

2005/0190312 A1      9/2005   Yang
2009/0244418 A1 *   10/2009   Pak ........................ H10D 86/60
                                                    349/39
(Continued)

FOREIGN PATENT DOCUMENTS

CN         101211118 A      7/2008
CN         103472646 A     12/2013
(Continued)

OTHER PUBLICATIONS

International Search Report and Written Opinion of the International Searching Authority issued Jan. 29, 2022 in International Application No. PCT/CN2021/127038, 20 pages.
(Continued)

*Primary Examiner* — Jonathan Y Jung
(74) *Attorney, Agent, or Firm* — XSENSUS LLP

(57)          ABSTRACT

Provided is an electronic paper. The electronic paper includes: an array substrate and a cover plate that are arranged oppositely, and an electrophoretic layer disposed between the array substrate and the cover plate. The array substrate includes: a substrate, a pixel electrode disposed on the substrate, a first auxiliary electrode disposed on the substrate and electrically connected to the pixel electrode, and a second auxiliary electrode disposed between the pixel electrode and the first auxiliary electrode, wherein the second auxiliary electrode is insulated from the pixel electrode and the first auxiliary electrode. An orthographic projection of the second auxiliary electrode on the substrate is at least partly overlapped with an orthographic projection of the pixel electrode on the substrate, and is at least partly (Continued)

D-D' overlapped with an orthographic projection of the first auxiliary electrode on the substrate.

13 Claims, 4 Drawing Sheets

(56) References Cited

U.S. PATENT DOCUMENTS

| | | | |
|---|---|---|---|
| 2010/0155735 A1 | 6/2010 | Park | |
| 2010/0271582 A1 | 10/2010 | Yamakawa et al. | |
| 2011/0241003 A1* | 10/2011 | Yamazaki | H10D 86/423 |
| | | | 257/E33.053 |
| 2011/0285617 A1* | 11/2011 | Huang | G02F 1/167 |
| | | | 345/107 |
| 2012/0086009 A1 | 4/2012 | Shin et al. | |
| 2017/0060317 A1* | 3/2017 | Kim | H10D 62/80 |
| 2017/0179231 A1* | 6/2017 | Jongman | H10K 59/1213 |
| 2019/0131318 A1* | 5/2019 | Xue | H10D 30/674 |
| 2022/0278178 A1* | 9/2022 | Song | H10K 59/80516 |

FOREIGN PATENT DOCUMENTS

| | | |
|---|---|---|
| CN | 104007574 A | 8/2014 |
| CN | 104423110 A | 3/2015 |
| CN | 105487315 A | 4/2016 |
| CN | 106444198 A | 2/2017 |
| CN | 107340665 A | 11/2017 |
| CN | 107402487 A | 11/2017 |
| CN | 108873552 A | 11/2018 |
| CN | 109270726 A | 1/2019 |
| CN | 106647079 B | 2/2019 |
| CN | 110752247 A | 2/2020 |
| CN | 110783490 A | 2/2020 |
| CN | 111739896 A | 10/2020 |
| CN | 215006189 U | 12/2021 |
| JP | 2018-073860 A | 5/2018 |
| KR | 10-2011-0057062 A | 5/2011 |
| KR | 10-2141561 B1 | 8/2020 |
| WO | 2019227649 A1 | 12/2019 |

OTHER PUBLICATIONS

International Search Report and Written Opinion mailed on Jan. 27, 2022, received for PCT Application PCT/CN2021/129584, filed on Nov. 9, 2021, 9 pages including English Translation.

Office Action issued on Jul. 1, 2024, in corresponding U.S. Appl. No. 17/915,173, 28 pages.

China National Intellectual Property Administration, First office action of Chinese application No. 202110710158.8 issued on Dec. 20, 2025, which is foreign counterpart application of this US application, 17 pages including English translation.

* cited by examiner

00

07
06
05—051
04
03
02—021
01

052—05

Cst

022—02

00

A

07

052

022

04

051

021

000

ELECTRONIC PAPER

CROSS-REFERENCE TO RELATED APPLICATION

This application is a U.S. national stage of international application No. PCT/CN2021/129584, field on Nov. 9, 2021, which claims priority to Chinese Patent Application No. 202011500714.0, filed on Dec. 18, 2020 and entitled "ELECTRONIC PAPER," the contents of which are herein incorporated by reference in their entireties.

TECHNICAL FIELD

The present disclosure relates to the field of display technologies, and in particular, relates to an electronic paper.

BACKGROUND

An electronic paper is a novel display device, which is mainly used in electronic labels, billboards, electronic readers, and the like. A display effect of the electronic paper is close to a display effect of a common paper, and the electronic paper reduces visual fatigue during reading.

SUMMARY

Embodiments of the present disclosure provide an electronic paper and a display device.

According to some embodiments, an electronic paper is provided. The electronic paper includes:

an array substrate and a cover plate that are arranged oppositely, and an electrophoretic layer disposed between the array substrate and the cover plate;

wherein the array substrate includes: a substrate, a pixel electrode disposed on the substrate, a first auxiliary electrode disposed on the substrate and electrically connected to the pixel electrode, and a second auxiliary electrode disposed between the pixel electrode and the first auxiliary electrode, the second auxiliary electrode being insulated from the pixel electrode and the first auxiliary electrode;

wherein an orthographic projection of the second auxiliary electrode on the substrate is at least partly overlapped with an orthographic projection of the pixel electrode on the substrate, and is at least partly overlapped with an orthographic projection of the first auxiliary electrode on the substrate.

Optionally, the array substrate further includes a thin-film transistor including a source-drain electrode electrically connected to the pixel electrode;

wherein the source-drain electrode and the first auxiliary electrode are arranged on a same layer, and are made of a same material; or, the source-drain electrode and the second auxiliary electrode are arranged on a same layer, and are made of a same material.

Optionally, the thin-film transistor further includes a gate electrode;

wherein the gate electrode and the first auxiliary electrode are arranged on a same layer, and are made of a same material; and the source-drain electrode and the second auxiliary electrode are arranged on a same layer, and are made of a same material.

Optionally, the thin-film transistor further includes an active layer insulated from the gate electrode;

wherein the active layer is lapped with the source-drain electrode, the source-drain electrode is disposed on a side, distal from the substrate, of the active layer, and the gate electrode is disposed on a side, proximal to the substrate, of the active layer.

Optionally, the array substrate includes a plurality of pixel regions arranged in array, each of the plurality of pixel regions being provided with two thin-film transistors connected in series.

Optionally, the array substrate further includes: a gate line electrically connected to the gate electrode, a data line electrically connected to the source-drain electrode, and an auxiliary electrode line electrically connected to the second auxiliary electrode;

wherein an extension direction of the gate line is intersected with an extension direction of the data line, and is intersected with an extension direction of the auxiliary electrode line.

Optionally, the extension direction of the data line is perpendicular to the extension direction of the gate line, and is parallel to the extension direction of the auxiliary electrode line.

Optionally, a width of the data line is less than a width of the auxiliary electrode line.

Optionally, the array substrate further includes: a first insulative layer disposed between the second auxiliary electrode and the first auxiliary electrode, and a second insulative layer disposed between the second auxiliary electrode and the pixel electrode;

wherein the first insulative layer is provided with a first via hole, the second insulative layer is provided with a second via hole communicated with the first via hole, and the pixel electrode is electrically connected to the first auxiliary electrode by the first via hole and the second via hole.

Optionally, an orthographic projection of the first via hole on the substrate is within an orthographic projection of the second via hole on the substrate.

Optionally, the orthographic projection of the second auxiliary electrode on the substrate is within the orthographic projection of the first auxiliary electrode on the substrate, and the orthographic projection of the first auxiliary electrode on the substrate is within the orthographic projection of the pixel electrode on the substrate.

Optionally, an area of the orthographic projection of the first auxiliary electrode on the substrate is less than an area of the orthographic projection of the pixel electrode on the substrate.

According to some embodiments, a display device is provided. The display device includes an electronic paper according to any one of above embodiments.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure is described in further detail with reference to the enclosed drawings, to clearly present the objects, technical solutions, and advantages of the present disclosure.

In a device known to the inventor, the electronic paper generally includes: an array substrate and a cover plate that are arranged oppositely, and an electrophoretic layer disposed between the array substrate and the cover plate. The array plate includes a plurality of pixels arranged in arrays, and each of the plurality of pixels includes: a pixel electrode, and an auxiliary electrode insulated from the array substrate. The pixel electrode and the auxiliary electrode forms a storage capacitor when displaying, such that a voltage loaded on the pixel electrode is maintained stable.

However, with constant increase of the number of pixels per inch (PPI) in the array substrate, a size of each pixel electrode of the array substrate continuously decreases, such that an overlap area between the pixel electrode and the auxiliary electrode continuously decreases, and further a capacitance of the storage capacitor formed between the pixel electrode and the auxiliary electrode continuously decreases. In this way, the stability of the voltage loaded on the pixel electrode is affected, leading to a poor display effect of the electronic paper prepared by the array substrate.

Figure 1:
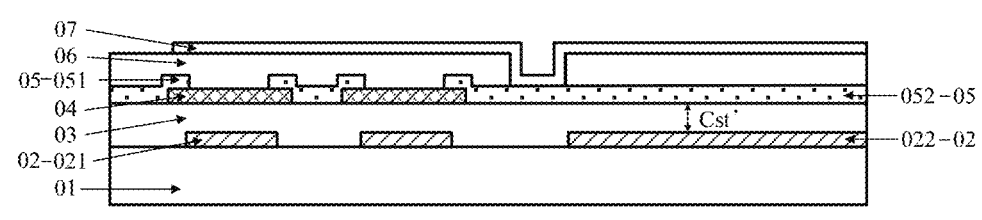
FIG. 1 is a film layer structural schematic diagram of an array substrate in an electronic paper known to the inventor.

FIG. 1 is a film layer structural schematic diagram of an array substrate in an electronic paper known to the inventor. Referring to FIG. 1, in the device known to the inventor, the array substrate 00 includes: a substrate 01, a first conductive pattern 02 disposed on the substrate 01 and stacked along a direction perpendicular to and away from the substrate 01, a first insulative layer 03, an active layer 04, a second conductive pattern 05, a second insulative layer 06, and a pixel electrode 07. The first conductive pattern 02 includes: a gate electrode 021 and a first auxiliary electrode 022. The second conductive pattern 05 includes: a source-drain electrode 051 and a second auxiliary electrode 052. The second auxiliary electrode 052 is electrically connected to one of a source electrode and a drain electrode of the source-drain electrode 051, and is electrically connected to the pixel electrode 07 by a via hole in the second insulative layer 06.

Figure 2:
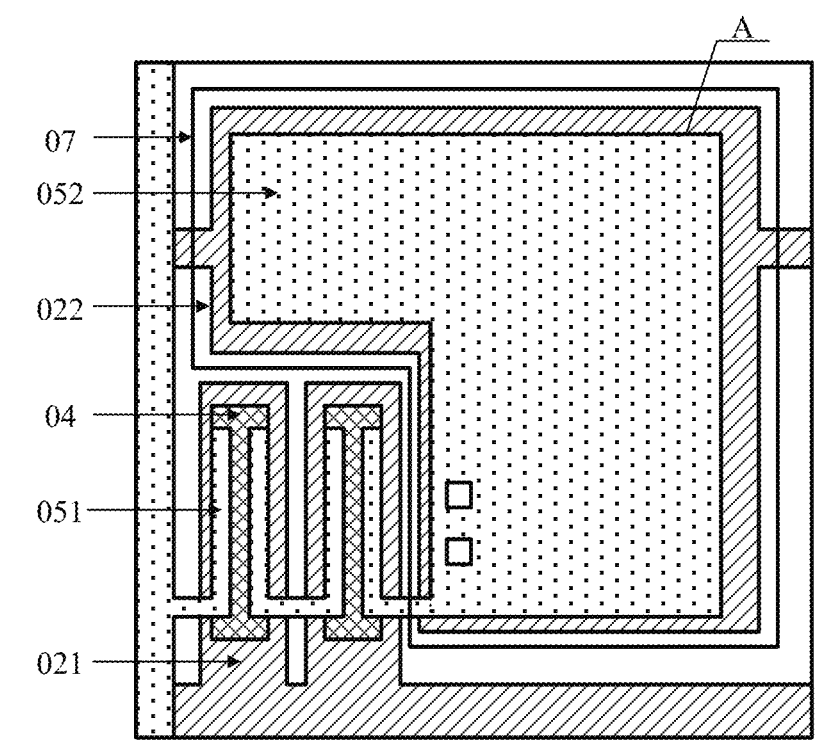
FIG. 2 is a top view of an array substrate shown in FIG. 1.

FIG. 2 is a top view of an array substrate shown in FIG. 1. Referring to FIG. 2, in the array substrate 00, an overlap region A is present between an orthographic projection of a first auxiliary electrode 022 on the substrate 01 and an orthographic projection of the second auxiliary electrode 052 on the substrate 01.

Because the second auxiliary electrode 052 is electrically connected to the pixel electrode 07 by the via hole on the second insulative layer 06, when the electronic paper prepared by the array substrate 00 is used for displaying, a voltage loaded on the second auxiliary electrode 052 is consistent with a voltage loaded on the pixel electrode 07, which are both pixel voltages. That is, the second auxiliary electrode 052 is equivalent to the pixel electrode 07. In this way, when the electronic paper prepared by the array substrate 00 is used for displaying, the first auxiliary electrode 022 and the second auxiliary electrode 052 form a storage capacitor Cst', which maintains a stability of the voltage loaded on the pixel electrode 07. The greater a capacitance of the storage capacitor Cst' is, the better an effect of maintaining the stability of the voltage loaded on the pixel electrode 07 is.

However, with a continuously increase of the number of pixels per inch (PPI) in the array substrate, a size of each pixel in the array substrate 00 continuously decreases, such that an overlap area between the first auxiliary electrode 022 and the second auxiliary electrode 052 continuously decreases, and further the capacitance of the storage capacitor Cst' continuously decreases. In this way, the stability of the voltage loaded on the pixel electrode is affected, leading to a poor display effect of the electronic paper prepared by the array substrate.

Figure 3:
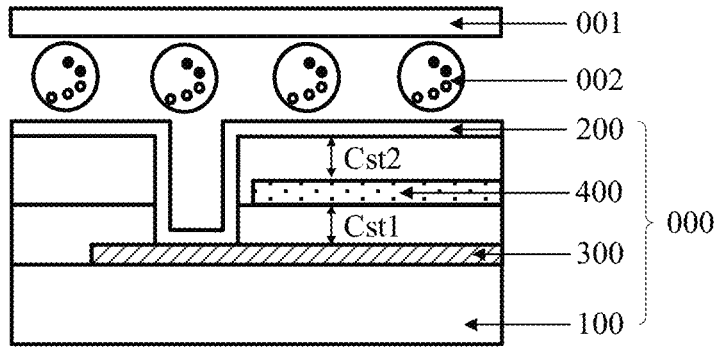
FIG. 3 is film layer structural schematic diagram of an electronic paper according to some embodiments of the present disclosure.

FIG. 3 is film layer structural schematic diagram of an electronic paper according to some embodiments of the present disclosure. Referring to FIG. 3, the electronic paper includes: an array substrate 000 and a cover plate 001 that are oppositely arranged, and an electrophoretic layer 002 disposed between the array substrate 000 and the cover plate 001.

The array substrate 000 includes: a substrate 100, a pixel electrode 200, a first auxiliary electrode 300, and a second auxiliary electrode 400.

The pixel electrode 200 is disposed on the substrate 100.

The first auxiliary electrode 300 is disposed on the base substrate 100 and is electrically connected to pixel electrode 200.

The second auxiliary electrode 400 is disposed between the pixel electrode 200 and the first auxiliary electrode 300, and is insulated from the pixel electrode 200 and the first auxiliary electrode 300.

Figure 4:
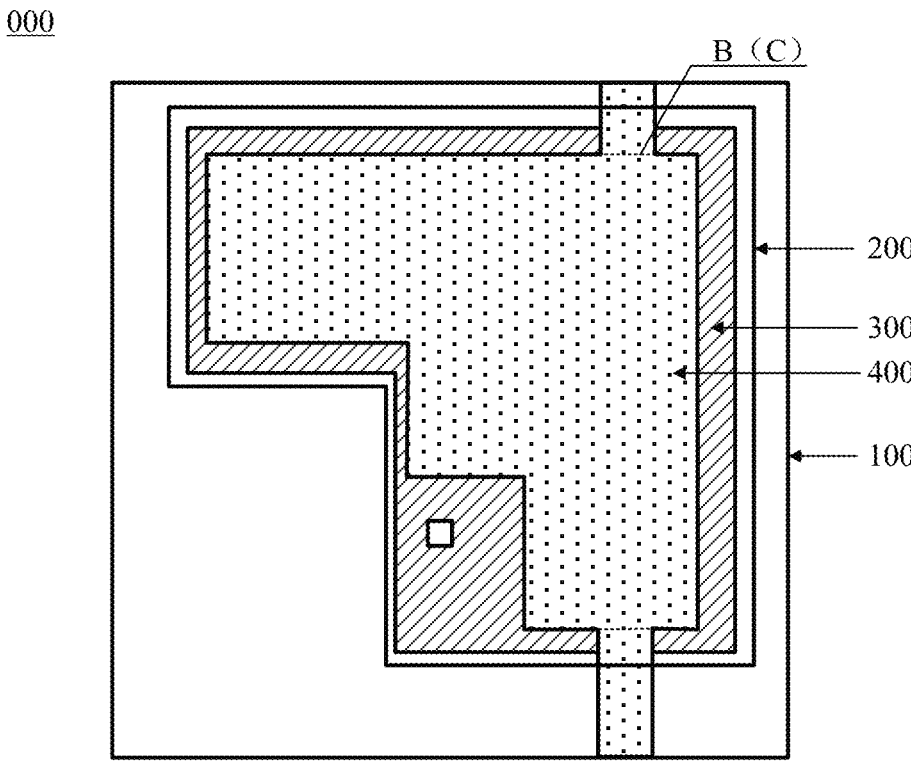
FIG. 4 is a top view of an array substrate of an electronic paper shown in FIG. 3.

FIG. 4 is a top view of an array substrate in an electronic paper shown in FIG. 3. Referring to FIG. 4, an overlap region B is present between an orthographic projection of the second auxiliary electrode 400 on the substrate 100 and an orthographic projection of the pixel electrode 200 on the substrate 100, and an overlap region C is present between the orthographic projection of the second auxiliary electrode 400 on the substrate 100 and an orthographic projection of the first auxiliary electrode 300 on the substrate 100.

Because the first auxiliary electrode 300 is electrically connected to the pixel electrode 200, when the electronic paper where the array substrate 000 is disposed is used for displaying, a voltage loaded on the first auxiliary electrode 300 is consistent with a voltage loaded on the pixel electrode 200, which are both pixel voltages. That is, the first auxiliary electrode 300 is also equivalent to the pixel electrode 200. In this way, when the electronic paper is used for displaying, the first auxiliary electrode 300 and the second auxiliary electrode 400 form a first storage capacitor Cst1, and the pixel electrode 200 and the second auxiliary electrode 400 form a second storage capacitor Cst2. The second auxiliary electrode 400 is disposed between the pixel electrode 200 and the first auxiliary electrode 300, therefore, by connecting the first storage capacitor Cst1 formed by the second auxiliary electrode 400 and the first auxiliary electrode 300 and the second storage capacitor Cst2 formed by the second auxiliary electrode 400 and the pixel electrode 200 in parallel, a capacitance of a total storage capacitor of the array substrate 000 is the sum of a capacitance of the first storage capacitor Cst1 and a capacitance of the second storage capacitor Cst2. In this way, the capacitance of the total storage capacitor in the array substrate 000 is great.

Referring to FIG. 1 and FIG. 2, in the device known to the inventor, assuming that an area of the overlap region A between the orthographic projection of the first auxiliary electrode 022 on the substrate 01 and the orthographic projection of the second auxiliary electrode 052 on the substrate 01 is S, then a thickness of the first insulative layer 03 disposed between the first auxiliary electrode 022 and the second auxiliary electrode 052 is 4000 Å. The first insulative layer 03 may be made of silicon nitride, wherein the silicon nitride has a relative dialectic constant of 6.5.

Then, the capacitance Ci' of the storage capacitor Cst' is obtained by calculating:

$$Ci' \approx \frac{8.854 \times 10^{-18} \times 6.5}{4000} \times 10000 \times S = 1.44 \times 10^{-16} \times S \tag{1}$$

However, referring to FIG. 3 and FIG. 4, in the present disclosure, assuming that an area of the overlap region B between the orthographic projection of the second auxiliary electrode 400 on the substrate 100 and the orthographic projection of the pixel electrode 200 on the substrate 100 is S, then an area of the overlap region C between the orthographic projection of the second auxiliary electrode 400 on the substrate 100 and the orthographic projection of the first auxiliary electrode 300 on the substrate 100 is also S. Because an insulative layer, disposed between the first auxiliary electrode 300 and the second auxiliary electrode 400, and the first insulative layer 03 known to the inventor have the same thickness and are made of the same material, the capacitance Ci1 of the first storage capacitor Cst1 is equal to the capacitance Ci' of the storage capacitor Cst' known to the inventor A thickness of an insulative layer disposed between the second auxiliary electrode 400 and the pixel electrode 200 ranges from 2000 Å to 6000 Å. The insulative layer is made of the same material as that of the first insulative layer 03, wherein the insulative layer also has a relative dialectic constant of 6.5.

Then, a minimum value $Ci2_{,min}$ of the capacitance of the second storage capacitor Cst2 is obtained by calculating:

$$Ci_{2,min} \approx \frac{8.854 \times 10^{-18} \times 6.5}{6000} \times 10000 \times S = 9.59 \times 10^{-17} \times S \tag{2}$$

A maximum value $Ci2_{,max}$ of the capacitance of the second storage capacitor Cst2 is obtained by calculating:

$$Ci_{2,max} \approx \frac{8.854 \times 10^{-18} \times 6.5}{2000} \times 10000 \times S = 2.87755 \times 10^{-16} \times S \tag{3}$$

Therefore, in the present disclosure, a range of the capacitance Ci of the total storage capacitor of the array substrate 000 is that:

$$Ci = Ci_1 + Ci_2 = 2.399 \times 10^{-16} \times S - 4.21 \times 10^{-16} \times S \tag{4}$$

Compared with the capacitance Ci of the storage capacitor of the array substrate 00 known to the inventor, the capacitance Ci of the total storage capacitor of the array substrate 000 according to the embodiments of the present disclosure is improved by 67% to 192%.

In summary, the electronic paper according to the embodiments of the present disclosure includes: the array substrate, the cover plate, and the electrophoretic layer Because the first auxiliary electrode of the array substrate is electrically connected to the pixel electrode, when the electronic paper is used for displaying, the voltage loaded on the first auxiliary electrode is consistent with the voltage loaded on the pixel electrode, which are both the pixel voltages. That is, the first auxiliary electrode is also equivalent to the pixel electrode. In this way, when the electronic paper is used for displaying, the first auxiliary electrode and the second auxiliary electrode form the second storage capacitor, and the pixel electrode and the second auxiliary electrode form the second storage capacitor. The first storage capacitor and the second storage capacitor are connected in parallel, such that the capacitance of the total storage capacitor of the array substrate is the sum of the capacitance of the first storage capacitor and the capacitance of the second storage capacitor. Compared with the device known to the inventor, the electronic paper according to the embodiments of the present disclosure has advantages, without changing PPI of the electronic paper, that the capacitance of the storage capacitor is increased, the stability of the voltage loaded on the pixel electrode is improved, and thus the display effect of the electronic paper is improved.

Figure 5:
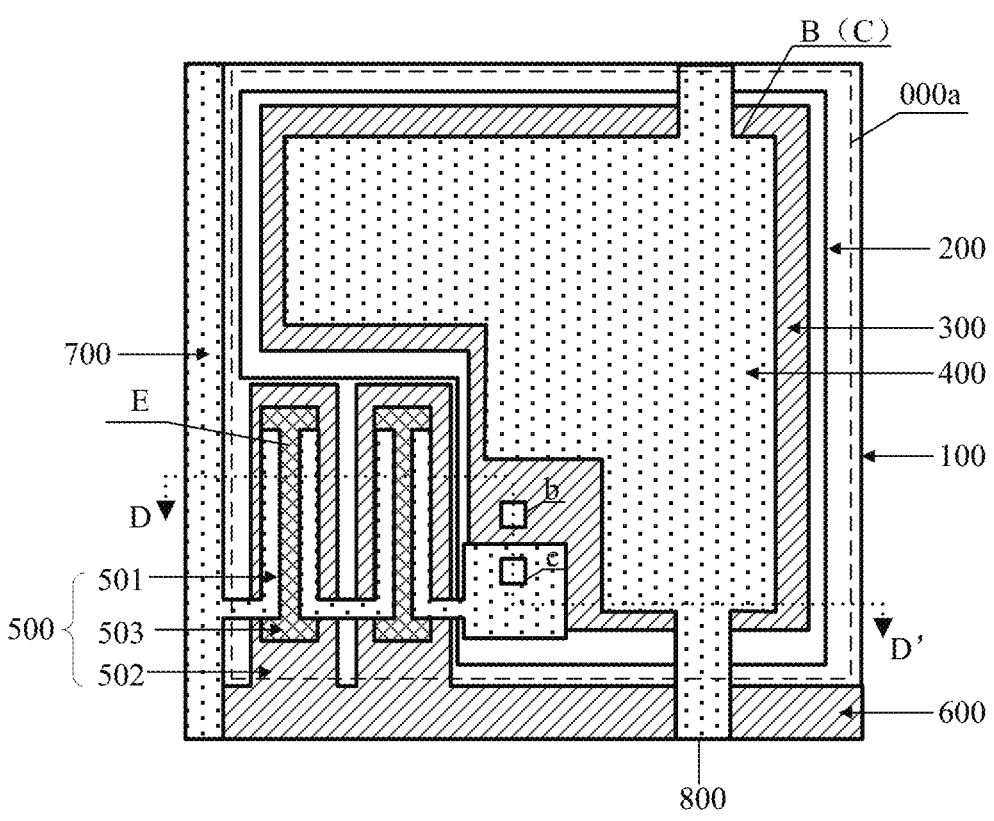
FIG. 5 is a top view of an array substrate of another electronic paper according to some embodiments of the present disclosure.
Figure 6:
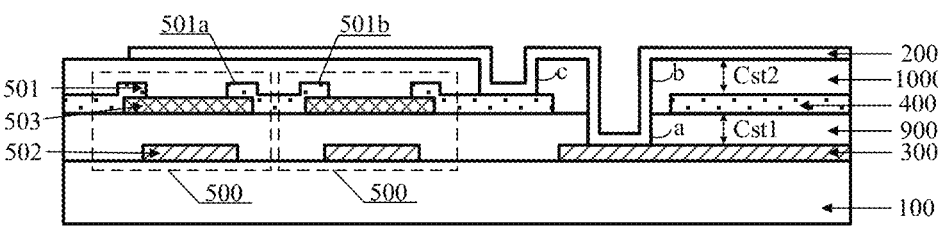
FIG. 6 is a cross-sectional diagram of an array substrate along D-D' shown in FIG. 5.

In the embodiments of the present disclosure, FIG. 5 is a top view of an array substrate in another electronic paper according to some embodiments of the present disclosure, and FIG. 6 is a cross-sectional diagram of an array substrate along D-D' shown in FIG. 5. Referring to FIG. 5 and FIG. 6, the array substrate 000 includes a thin-film transistor (TFT) 500. The thin-film transistor 500 includes a source-dram electrode 501 electrically connected to the pixel electrode 200.

In example embodiments of the present disclosure, the source-drain electrode 501 and the first auxiliary electrode 300 are arranged in the same layer, and are made of the same material. That is, the source-drain electrode 501 and the first auxiliary electrode 300 are formed by a one time patterning process.

In other example embodiments of the present disclosure, the source-drain electrode 501 and the second auxiliary electrode 400 are arranged in the same layer, and are made of the same material. That is, the source-drain electrode 501 and the second auxiliary electrode 400 are formed by the one-time patterning process.

In this way, a manufacturing process of the array substrate 000 is simplified, and thus difficulties and costs of manufacturing the array substrate 000 are reduced. It should be noted that, FIG. 5 is a schematic description using a scenario where the source-drain electrode 501 and the second auxiliary electrode 400 are arranged in the same layer and are made of the same material.

In the embodiments of the present disclosure, as illustrated in FIG. 6, the thin-film transistor 500 further includes a gate electrode 502.

The gate electrode 502 of the thin-film transistor 500 and the first auxiliary electrode 300 are arranged in the same layer, and are made of a same material, and the source-drain electrode 501 of the thin-film transistor 500 and the second auxiliary electrode 4010 are arranged in the same layer and are made of the same material. That is, the gate electrode 502 and the first auxiliary electrode 300 are formed by the one-time patterning process, and the source-drain electrode 501 and the second auxiliary electrode 400 are formed by the one-time patterning process. In this way, the manufacturing process of the array substrate 000 is further simplified, and thus the difficulties and costs of manufacturing the array substrate 000 are further reduced.

In the embodiments of the present disclosure, as illustrated in FIG. 6, the thin-film transistor 500 further includes an active layer 503 insulated from the gate electrode 502.

The active layer 503 is lapped with the source-drain electrode 501, the source-drain electrode 501 is disposed on a side, distal form the substrate 100, of the active layer 503, and the gate electrode 502 is disposed on a side, proximal to the substrate 100, of the active layer 502. That is, the thin-film transistor 500 is a bottom-gate type thin-film transistor. In other example embodiments, the thin-film transistor 500 is also a top-gate type thin-film transistor, which is not limited herein.

In the embodiments of the present disclosure, referring to FIG. 5 and FIG. 6, the array substrate 000 includes a plurality of pixel regions 000a arranged in array. Each of the plurality of pixel regions 000a is provided with two thin-film transistors 500 connected in series.

Each of the two thin-film transistor 500 includes the source-drain electrode 501. The source-drain electrode 501 includes a first electrode 501a and a second electrode 501b. the first electrode 501a is one of the source electrode and the drain electrode, and the second electrode 502 is the other of the source electrode and the drain electrode. The first electrode 501a of one of the two thin-film transistor 500 is electrically connected to the second electrode 501b of the other of the two thin-film transistor 500, such that the two thin-film transistors are connected in series. In this way, the influence of a leakage current in the thin-film transistor 500 on the pixel voltage loaded on the pixel electrode 200 is reduced.

Exemplarily, as illustrated in FIG. 5, a channel region E of the active layer 503 of each of the two thin-film transistors 500 is a long-strip-shaped channel region. It should be noted that, the channel region E of the active layer 503 refers to a region, disposed between a region where the active layer 503 is in contact with the first electrode 501a and a region where the active layer 503 is in contact with the second electrode 501b, in the active layer 503. A width of the channel region E ranges from 20 μm to 40 μm. In this way, the charging rate requirement of the array substrate 000 is met.

In the embodiments of the present disclosure, as illustrated in FIG. 5, the array substrate 000 further includes: a gate line 600 electrically connected to the gate electrode 502, a data line 700 electrically connected to the source-drain electrode 501, and an auxiliary electrode line 800 electrically connected to second auxiliary electrode 400. Exemplarily, the gate line 600, the gate electrode 502, and the first auxiliary electrode 300 are arranged in the same layer, and are made of a same material. That is, the gate line 600, the gate electrode 502, and the first auxiliary electrode 300 are formed by the one-time patterning process. The data line 700, the auxiliary electrode line 800, the source-drain electrode 501, and the second auxiliary electrode 400 are arranged in the same layer, and are made of a same material. That is, the data line 700, the auxiliary electrode line 800, the source-drain electrode 501, and the second auxiliary electrode 400 are formed by the one-time patterning process.

An extension direction of the gate line 600 is intersected with an extension direction of the data line 700, and is intersected with an extension direction of the auxiliary electrode line 800. The gate line 600 and the data line 700, of which the extension directions are intersected, define the plurality of pixel regions 000a in the array substrate 000. Exemplarily, any two adjacent gate lines 600 and any two adjacent data lines 700 define a pixel region 000a.

Optionally, the extension direction of the data line 700 is perpendicular to the extension direction of the data line 600, and is parallel to the extension direction of the auxiliary electrode line 800. The gate line 600 and the data line 700, of which the extension directions are perpendicular, define that the plurality of pixel regions 000a are rectangles.

Furthermore, a width of the data line 700 is less than a width of the auxiliary electrode line 800. In this way, due to the less width of the data line 700, an area of a region where the data line 700 is at least partly overlapped with the gate line 600 is reduce. Therefore, a capacitance of a parasitic capacitor formed between the data line 700 and the gate line 600 is reduced, and thus the influence of the parasitic capacitor on the display effect of the electronic paper where the array substrate 000 is disposed is reduced. When the electronic paper where the array substrate 000 is disposed is used for displaying, a voltage loaded on the auxiliary electrode line 800 is constant. Therefore, the display effect of the electronic paper is not affected by a parasitic capacitor formed between the auxiliary electrode line 800 and the gate line 600, and the width of the auxiliary electrode line is grater to enhance the intension of the electronic paper and reduce the probability of damaging the electronic paper during use.

In the embodiments of the present disclosure, referring to FIG. 6, the array substrate 000 further includes: a first insulative layer 900 disposed between the second auxiliary electrode 400 and the first auxiliary electrode 300, and a second insulative layer 1000 disposed between the second auxiliary electrode 400 and the pixel electrode 200.

The first insulative layer 900 is provided with a first via hole a, and the second insulative layer 1000 is provided with a second via hole b communicated with the first via hole a. The pixel electrode 200 is electrically connected to the first auxiliary electrode 300 by the first via hole a and the second via hole b.

In the embodiments of the present disclosure, an orthographic projection of the first via hole a on the substrate 100 is within an orthographic projection of the second via hole b on the substrate 100.

Optionally, the second insulative layer 1000 is further provided with a third via hole c. The pixel electrode 200 is electrically connected to one of the first electrode 501a and the second electrode 501b of the source-drain electrode 501 by the third via hole c.

It should be noted that, the first insulative layer is configured as a gate insulative layer, such that in the thin-film transistor 500, the active layer 503 is insulated form the gate electrode 502.

In the embodiments of the present disclosure, as illustrated in FIG. 5, the orthographic projection of the second auxiliary electrode 400 on the substrate 100 is within the orthographic projection of the first auxiliary electrode 300 on the substrate 100, and the orthographic projection of the first auxiliary electrode 300 on the substrate 100 is within the orthographic projection of the pixel electrode 200 on the substrate 100. In this way, the areas of the overlap region B, between the orthographic projection of the second auxiliary electrode 400 on the substrate 100 and the orthographic projection of the pixel electrode 200 on the substrate 100, and the overlap region C, between the orthographic projection of the second auxiliary electrode 400 on the substrate 100 and the orthographic projection of the first auxiliary electrode 300 on the substrate 100, are both an area of the second auxiliary electrode 400. That is, the overlap region B, between the orthographic projection of the second auxiliary electrode 400 on the substrate 100 and the orthographic projection of the pixel electrode 200 on the substrate 100, is consistent with the overlap region C, between the orthographic projection of the second auxiliary electrode 400 on the substrate 100 and the orthographic projection of the first auxiliary electrode 300 on the substrate 100. Therefore, the capacitance Ci of the total storage capacitor of the array substrate 000 is changed by changing the area of the second auxiliary electrode 400. Exemplarily, the more the area of the second auxiliary electrode 400 is, the more the capacitance Ci of the total storage capacitor of the array substrate 000 is; otherwise, the less the area of the second auxiliary electrode 400 is, the less the capacitance Ci of the total storage capacitor of the array substrate 000 is.

It should be noted that, the capacitance Ci of the total storage capacitor of the array substrate 000 is also changed by changing a thickness of the second insulative layer 1000. Exemplarily, the more the thickness of the second insulative layer 1000 is, the less the capacitance Ci of the total storage capacitor of the array substrate 000 is; otherwise, the less the thickness of the second insulative layer 1000 is, the more the capacitance Ci of the total storage capacitor of the array substrate 000 is.

It should be further noted that, the orthographic projection of the first auxiliary electrode 300 on the substrate 100 is not overlapped with an orthographic projection of the source-drain electrode 501 on the substrate 100. In this way, electric field interference is not formed between the first auxiliary electrode 300 and the source-drain electrode 501.

Figure 7:
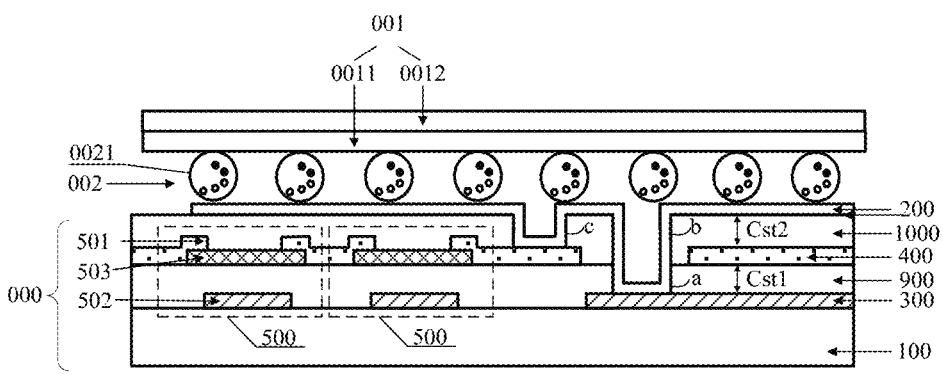
FIG. 7 is a film layer structural schematic diagram of another electronic paper according to some embodiments of the present disclosure.

In the embodiments of the present disclosure. FIG. 7 is a film layer structural schematic diagram of another electronic paper according to some embodiments of the present disclosure.

Referring to FIG. 7, the cover plate 001 of the electrode paper includes a second substrate 0011 and a common electrode 0012 disposed on the second substrate 0011. The common electrode 0012 faces towards the pixel electrode 200 of the array substrate 000.

The electrophoretic layer 002 of the electronic paper includes a plurality of electrophoretic capsules 0021. Each of the plurality of the electrophoretic capsules 0021 includes: a capsule body, and electrophoretic solution and charged particles that are disposed inside the capsule body. The charged particles include: black particles, white particles, color particles, and the like.

In the embodiments of the present disclosure, when the pixel electrode 200 of the array substrate 000 is applied a voltage, a voltage difference is formed between the pixel electrode 200 and the common electrode 0012. The charged particles in each electrophoretic capsule 0021 move in the electrophoretic solution, under an action of the voltage difference, to achieve the display of the electronic paper.

Optionally, in the array substrate 000, an area of the orthographic projection of the first auxiliary electrode 300 on the substrate 100 is less than an area of the orthographic projection of the pixel electrode 200 on the substrate 100. In this way, when the electronic paper is used for displaying, the pixel electrode 200 achieves an electric field shielding function for the first auxiliary electrode 300, such that an electric field is not formed between the first auxiliary electrode 300 and common electrode 0012 of the cover plate 001, and thus the display effect of the electronic paper is not affected.

In summary, the electronic paper according to the embodiments of the present disclosure includes: the array substrate, the cover plate, and the electrophoretic layer. Because the first auxiliary electrode of the array substrate is electrically connected to the pixel electrode, when the electronic paper is used for displaying, the voltage loaded on the first auxiliary electrode is consistent with the voltage loaded on the pixel electrode, which are both the pixel voltages. That is, the first auxiliary electrode is also equivalent to the pixel electrode. In this way, when the electronic paper is used for displaying, the first auxiliary electrode and the second auxiliary electrode form the second storage capacitor, and the pixel electrode and the second auxiliary electrode form the second storage capacitor. The first storage capacitor and the second storage capacitor are connected in parallel, such that the capacitance of the total storage capacitor of the array substrate is the sum of the capacitance of the first storage capacitor and the capacitance of the second storage capacitor. Compared with the device known to the inventor, the electronic paper according to the embodiments of the present disclosure has advantages, without changing the PPI of the electronic paper, that the capacitance of the storage capacitor is increased, the stability of the voltage loaded on the pixel electrode is improved, and thus the display effect of the electronic paper is improved.

The embodiments of the present disclosure provide a method for manufacturing an array substrate in an electronic paper. The method is configured to manufacture the array substrate shown in FIG. 5. The method includes the following steps.

In step A, a first conductive pattern is formed on a substrate.

Optionally, the first conducive pattern is made of: a molybdenum metal (Mo), a titanium metal (Ti), a copper metal (Cu), an aluminum metal (Al), or an alloy material. The first conductive pattern includes: a gate electrode, a gate line, and a first auxiliary electrode.

Exemplarily, a first conductive thin film is formed by performing any one of depositing, coating, and sputtering on the substrate. Then the first conductive pattern is formed by performing a one-time pattering process on the first conductive thin film. The one-time patterning process includes: photoresist coating, exposing, developing, etching, and photoresist stripping.

In step B, a first insulative layer is formed on the first conductive pattern.

Optionally, the first insulative layer is made of silicon dioxide, silicon nitride, or other high-dialectic constant material.

Exemplarily, a first insulation thin film is formed by performing any one of depositing, coating, and sputtering on the substrate where the first conductive pattern is formed. Then the first insulative layer is formed by performing the one-time patterning process on the first insulation thin film. The one-time patterning process includes: photoresist coating, exposing, developing, etching, and photoresist stripping.

In step C, an active layer is formed on the first insulative layer.

Optionally, the active layer is made of: polysilicon, amorphous silicon, oxide semiconductor, and other semiconductor material.

Exemplarily, an active layer thin film is formed by performing any one of depositing, coating, and sputtering on the substrate where the first insulative layer is formed. Then the active laver is formed by performing the one-time patterning process on the active layer thin film. The one-time patterning process includes: photoresist coating, exposing, developing, etching, and photoresist stripping.

In step D, a second conductive pattern is formed on the active layer.

Optionally, the second conducive pattern is made of: a molybdenum metal (Mo), a titanium metal (Ti), a copper metal (Cu), an aluminum metal (Al), or an alloy material.

The second conductive pattern includes: a source-drain electrode, a second auxiliary electrode, a data line, and an auxiliary electrode line.

Exemplarily, a second conductive thin film is formed by performing any one of depositing, coating, and sputtering on the substrate where the active layer is formed. Then the second conductive pattern is formed by performing the one-time pattering process on the second conductive thin film. The one-time patterning process includes: photoresist coating, exposing, developing, etching, and photoresist stripping.

In step E, a second insulative layer is formed on the second conductive pattern.

Optionally, the second insulative layer is made of silicon dioxide, silicon nitride, or other high-dialectic constant material.

Exemplarily, a second insulation thin film is formed by performing any one of depositing, coating, and sputtering on the substrate where the second conductive pattern is formed. Then the second insulative layer is formed by performing the one-time patterning process on the second insulation thin film. The one-time patterning process includes: photoresist coating, exposing, developing, etching, and photoresist stripping.

In step F, a pixel electrode is formed on the second insulative layer.

Optionally, the pixel electrode is made of: indium tin oxide (ITO), indium zinc oxide (IZO), and other transparent conductive material.

Exemplarily, a pixel electrode thin film is formed by performing any one of depositing, coating, and sputtering on the substrate where the second insulative layer is formed. Then the pixel electrode is formed by performing the one-time patterning process on the pixel electrode thin film. The one-time patterning process includes: photoresist coating, exposing, developing, etching, and photoresist stripping.

It may be clearly understood by those skilled in the art that, for the convenience and conciseness of the description, the working principles and connection relations of each structure of the array substrate described above refers to the corresponding content in the embodiments of the structure of the array substrate, which is not repeated herein.

The embodiments of the present disclosure provide a display device including the electronic paper as described above. The display device is an electronic label, a billboard, an electronic reader, or the like.

It should be pointed out that in the accompanying drawings, the sizes of layers and regions may be exaggerated for clearer illustration. It should be understood that in the case that an element or layer is referred to as being "on" another element or layer, it may be directly on another element, or intervening layers may be present. In addition, it should be understood that in the case that an element or layer is referred to as being "under" another element or layer, the layer may be directly under the other element, or there may be more than one intervening layer or element. In addition, it can further be understood that in the case that a layer or element is referred to as being "between" two layers or two elements, the layer may be the only layer between the two layers or two elements, or more than one intervening layer or element may also be present. Similar reference numerals indicate similar elements throughout.

In the present disclosure, the term "same layer" refers to a relationship between layers formed simultaneously in the same step. For example, in the case that the source-drain electrode and the first auxiliary electrode are formed when one or more steps of a same patterning process are performed in a material of the same layer, these electrodes are disposed in the same layer. In another example, by performing the step of forming the source-drain electrode and the step of forming the first auxiliary electrode simultaneously, the source-drain electrode and the first auxiliary electrode may be formed in the same lay er. The term "same layer" does not always mean that the thicknesses of the layers or layers in the cross-sectional view are the same.

In the present disclosure, the terms "first" and "second" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. An electronic paper, comprising:

an array substrate and a cover plate that are arranged oppositely, and an electrophoretic layer disposed between the array substrate and the cover plate;

wherein the array substrate comprises: a substrate, a pixel electrode disposed on the substrate, a first auxiliary electrode disposed on the substrate and electrically connected to the pixel electrode, and a second auxiliary electrode disposed between the pixel electrode and the first auxiliary electrode, the second auxiliary electrode being insulated from the pixel electrode and the first auxiliary electrode;

wherein an orthographic projection of the second auxiliary electrode on the substrate is at least partly overlapped with an orthographic projection of the pixel electrode on the substrate, and is at least partly overlapped with an orthographic projection of the first auxiliary electrode on the substrate;

the array substrate further comprises a data line and an auxiliary electrode line, the array substrate comprises a plurality of pixel regions arranged in array, wherein each of the plurality of pixel regions is provided with two thin-film transistors connected in series, and each of the two thin film transistors comprises a source-drain electrode; and the auxiliary electrode line is electrically connected to the second auxiliary electrode, an extension direction of the data line is parallel to an extension direction of the auxiliary electrode line, and a width of the data line is less than a width of the auxiliary electrode line; wherein the array substrate further comprises: a first insulative layer disposed between the second auxiliary electrode and the first auxiliary electrode, and a second insulative layer disposed between the second auxiliary electrode and the pixel electrode;

the first insulative layer is provided with a first via hole, the second insulative layer is provided with a second via hole communicated with the first via hole, and the pixel electrode is electrically connected to the first auxiliary electrode by the first via hole and the second via hole; and the second insulative layer is further provided with a third via hole, and the pixel electrode is electrically connected to the source-drain electrode by the third via hole; the first via hole, the second via hole, and the third via hole are located on a same side of the two thin-film transistors, and between the two thin-film transistors and the second auxiliary electrode.

2. The electronic paper according to claim 1, wherein each of the two thin-film transistors further comprises a gate electrode;

wherein the gate electrode and the first auxiliary electrode are arranged on a same layer, and are made of a same material; and the source-drain electrode and the second auxiliary electrode are arranged on a same layer, and are made of a same material.

3. The electronic paper according to claim 2, wherein each of the two thin-film transistors further comprises an active layer insulated from the gate electrode;

wherein the active layer is lapped with the source-drain electrode, the source-drain electrode is disposed on a side, distal from the substrate, of the active layer, and the gate electrode is disposed on a side, proximal to the substrate, of the active layer.

4. The electronic paper according to claim 2, wherein the array substrate further comprises: a gate line electrically connected to the gate electrode;

wherein an extension direction of the gate line is intersected with the extension direction of the data line, and is intersected with the extension direction of the auxiliary electrode line.

5. The electronic paper according to claim 4, wherein the extension direction of the data line is perpendicular to the extension direction of the gate line.

6. The electronic paper according to claim 1, wherein an orthographic projection of the first via hole on the substrate is within an orthographic projection of the second via hole on the substrate.

7. The electronic paper according to claim 1, wherein the orthographic projection of the second auxiliary electrode on the substrate is within the orthographic projection of the first auxiliary electrode on the substrate, and the orthographic projection of the first auxiliary electrode on the substrate is within the orthographic projection of the pixel electrode on the substrate.

8. The electronic paper according to claim 7, wherein an area of the orthographic projection of the first auxiliary electrode on the substrate is less than an area of the orthographic projection of the pixel electrode on the substrate.

9. A display device, comprising an electronic paper; wherein the electronic paper comprises:

an array substrate and a cover plate that are arranged oppositely, and an electrophoretic layer disposed between the array substrate and the cover plate;

wherein the array substrate comprises: a substrate, a pixel electrode disposed on the substrate, a first auxiliary electrode disposed on the substrate and electrically connected to the pixel electrode, and a second auxiliary electrode disposed between the pixel electrode and the first auxiliary electrode, the second auxiliary electrode being insulated from the pixel electrode and the first auxiliary electrode;

wherein an orthographic projection of the second auxiliary electrode on the substrate is at least partly overlapped with an orthographic projection of the pixel electrode on the substrate, and is at least partly overlapped with an orthographic projection of the first auxiliary electrode on the substrate;

the array substrate further comprises a data line and an auxiliary electrode line, and the array substrate comprises a plurality of pixel regions arranged in array, wherein each of the plurality of pixel regions is provided with two thin-film transistors connected in series, and each of the two thin-film transistors comprises a source-drain electrode; and the auxiliary electrode line is electrically connected to the second auxiliary electrode, an extension direction of the data line is parallel to an extension direction of the auxiliary electrode line, and a width of the data line is less than a width of the auxiliary electrode line wherein the array substrate further comprises: a first insulative layer disposed between the second auxiliary electrode and the first auxiliary electrode, and a second insulative layer disposed between the second auxiliary electrode and the pixel electrode;

the first insulative layer is provided with a first via hole, the second insulative layer is provided with a second via hole communicated with the first via hole, and the pixel electrode is electrically connected to the first auxiliary electrode by the first via hole and the second via hole; and the second insulative layer is further provided with a third via hole, and the pixel electrode is electrically connected to the source-drain electrode by the third via hole; the first via hole, the second via hole, and the third via hole are located on a same side of the two thin-film transistors, and between the two thin-film transistors and the second auxiliary electrode.

10. The display device according to claim 9, wherein each of the two thin-film transistors further comprises a gate electrode;

wherein the gate electrode and the first auxiliary electrode are arranged on a same layer, and are made of a same material; and the source-drain electrode and the second auxiliary electrode are arranged on a same layer, and are made of a same material.

11. The display device according to claim 10, wherein each of the two thin-film transistors further comprises an active layer insulated from the gate electrode;

wherein the active layer is lapped with the source-drain electrode, the source-drain electrode is disposed on a side, distal from the substrate, of the active layer, and the gate electrode is disposed on a side, proximal to the substrate, of the active layer.

12. The display device according to claim 10, wherein the array substrate further comprises: a gate line electrically connected to the gate electrode;

wherein an extension direction of the gate line is intersected with the extension direction of the data line, and is intersected with the extension direction of the auxiliary electrode line.

13. The display device according to claim 12, wherein the extension direction of the data line is perpendicular to the extension direction of the gate line.

* * * * *